United States Patent
Bonifas et al.

(10) Patent No.: US 10,622,718 B2
(45) Date of Patent: Apr. 14, 2020

(54) RADIO FREQUENCY CIRCUIT WITH CONDUCTIVE LOOP

(71) Applicant: 3M INNOVATIVE PROPERTIES COMPANY, St. Paul, MN (US)

(72) Inventors: Andrew P. Bonifas, Alberta (CA); Ronald D. Jesme, Plymouth, MN (US); Jaewon Kim, Woodbury, MN (US); Brock A. Hable, Woodbury, MN (US); Nicholas G. Amell, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 61 days.

(21) Appl. No.: 15/773,253

(22) PCT Filed: Nov. 2, 2016

(86) PCT No.: PCT/US2016/060001
§ 371 (c)(1),
(2) Date: May 3, 2018

(87) PCT Pub. No.: WO2017/083142
PCT Pub. Date: May 18, 2017

(65) Prior Publication Data
US 2018/0241125 A1 Aug. 23, 2018

Related U.S. Application Data

(60) Provisional application No. 62/252,905, filed on Nov. 9, 2015.

(51) Int. Cl.
*H01Q 7/00* (2006.01)
*H01Q 1/22* (2006.01)
(Continued)

(52) U.S. Cl.
CPC .............. *H01Q 7/00* (2013.01); *H01Q 1/2208* (2013.01); *H01Q 5/35* (2015.01); *H01Q 21/08* (2013.01);
(Continued)

(58) Field of Classification Search
CPC ......... H01Q 7/00; H01Q 1/2208; H01Q 21/08
See application file for complete search history.

(56) References Cited

U.S. PATENT DOCUMENTS

| 4,504,788 A | 3/1985 | Froncisz |
| 7,268,687 B2 | 9/2007 | Egbert |

(Continued)

OTHER PUBLICATIONS

Lee, "RFID Coil Design", Microchip Technology Inc., AN678, 1998, 21 pages.
(Continued)

*Primary Examiner* — Graham P Smith
(74) *Attorney, Agent, or Firm* — C. Michael Geise

(57) ABSTRACT

At least some aspects of the present disclosure feature an RF device including a conductive loop and a plurality of resonant circuits. Each of the plurality of resonant circuits is electromagnetically coupled to the conductive loop with an effective coupling coefficient. The effective coupling coefficient has a relative low absolute value such that each of the plurality of resonant circuits has a distinctive resonant frequency.

15 Claims, 11 Drawing Sheets

(51) Int. Cl.
*H04B 5/00* (2006.01)
*H01Q 5/35* (2015.01)
*H01Q 21/08* (2006.01)

(52) U.S. Cl.
CPC ......... *H04B 5/0056* (2013.01); *H04B 5/0075* (2013.01)

(56) References Cited

U.S. PATENT DOCUMENTS

| | | |
|---|---|---|
| 8,401,471 B2 | 3/2013 | Sala Sabate |
| 2006/0044769 A1 | 3/2006 | Forster |
| 2006/0244676 A1 | 11/2006 | Uesaka |
| 2014/0062827 A1 | 3/2014 | Kato |
| 2014/0347244 A1* | 11/2014 | Pagani .................... H01Q 7/00 343/867 |

OTHER PUBLICATIONS

Sun, "MISE-PIPE: Magnetic Induction-Based Wireless Sensor Networks for Underground Pipeline Monitoring", Ad Hoc Networks, 2011, vol. 9, pp. 218-227.

Sun, "Underground Wireless Communication using Magnetic Induction", IEEE International Conference on Communications, 2009, 5pgs.

International Search Report for PCT International Application No. PCT/US2016/060001, dated Feb. 8, 2017, 4pgs.

\* cited by examiner

US 10,622,718 B2

RADIO FREQUENCY CIRCUIT WITH CONDUCTIVE LOOP

CROSS REFERENCE TO RELATED APPLICATIONS

This is a national stage filing under 35 U.S.C. 371 of PCT/US2016/060001, filed Nov. 2, 2016, which claims priority to U.S. Provisional Application No. 62/252,905, filed Nov. 9, 2015, the disclosure of which is incorporated by reference in their entirety herein.

TECHNICAL FIELD

The present disclosure relates to a radio frequency (RF) circuit or device having conductive loop(s).

SUMMARY

At least some aspects of the present disclosure feature an RF device, comprising: a closed conductive loop and a plurality of resonant circuits. Each of the plurality of resonant circuits is electromagnetically coupled to the conductive loop with an effective coupling coefficient. The effective coupling coefficient has a relative low absolute value such that each of the plurality of resonant circuits has a distinctive resonant frequency.

At least some aspects of the present disclosure feature a sensor system comprising a sensing unit configured to detect environmental conditions, and an RF circuit. The RF circuit comprises a closed conductive loop and one or more resonant circuits electromagnetically coupled to the conductive loop with an effective coupling coefficient. At least one of the one or more resonant circuits is electromagnetically coupled to the sensing unit and configured to receive a sensing signal from the sensing unit. The RF circuit is configured to transmit the sensing signal.

BRIEF DESCRIPTION OF DRAWINGS

The accompanying drawings are incorporated in and constitute a part of this specification and, together with the description, explain the advantages and principles of the invention. In the drawings.

FIGS. 2H-1 and 2H-2 shows the RF device illustrated in FIG. 2H in various configurations;

Figure 1A:
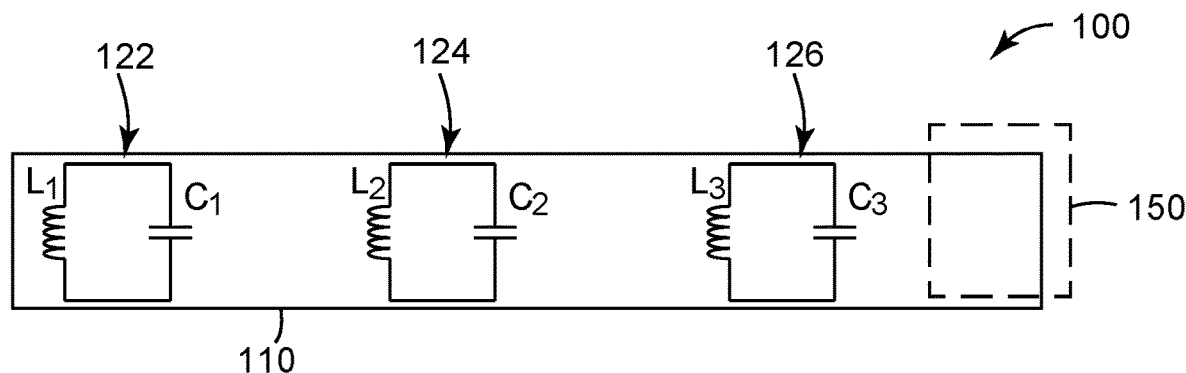
FIG. 1A is a schematic diagram of one example of an RF device.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled to" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled to," or "directly in contact with" another element, there are no intervening elements, components or layers for example.

Some aspects of the present disclosure are directed to a radio frequency (RF) interface device, which may receive power via an RF interface. As used herein, RF is used to refer to a broad class of wireless communication interfaces that can provide communication and power, including far field communication and near field communication, which may utilize a specific communication protocol. Near field communication includes, but is not limited to, near field communication using the set of standard protocols defined by the NFC Forum industry association (NFC).

A conductive loop can be used to improve magnetic coupling between a reader and an RF device, which may contain one or more resonant circuits. The use of a conductive loop can control the coupling between the reader and the RF device, improve read range, reduce dependency on read angle, and reduce adverse interactions between conductive and magnetic reader components on the RF device. For example, a conductive loop can include a first portion coupling with the RF device and a second portion coupling with the reader, where the second portion and the first portion are spaced apart, such that the reader does not affect the operation of the RF device. In some embodiments, the conductive loop can preferentially direct the magnetic flux of the coupled RF device. In some embodiments, the conductive loop can be coupled to multiple resonant circuits with a relative low coupling such that each of the resonant circuits has a distinctive resonant frequency. In some embodiments, the coupling is low such that the frequency shift caused by the conductive loop is less than 10% of the original frequency in free space.

Figure 1B:
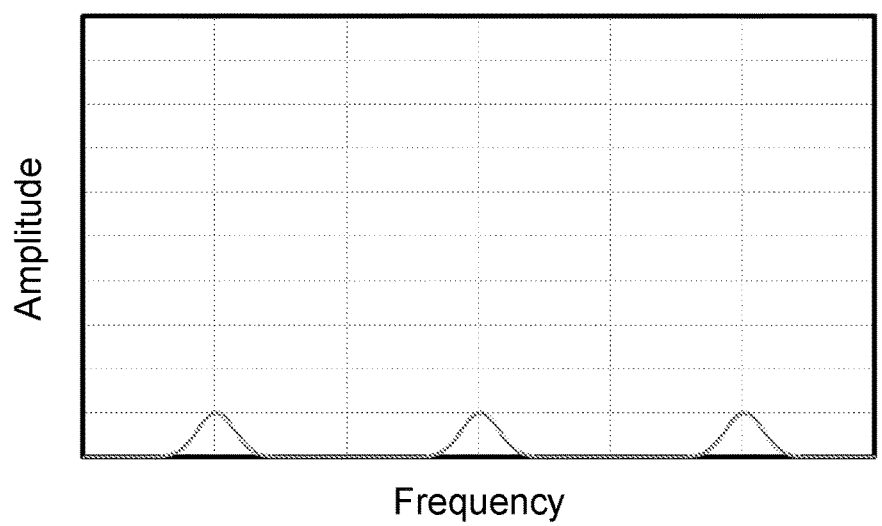
FIG. 1B illustrates a graph of resonant frequencies.

FIG. 1A is a schematic diagram of one example of an RF device 100. The RF circuit 100 includes a closed conductive loop 110 and multiple resonant circuits (122, 124, and 126). Each of the plurality of resonant circuits is electromagnetically coupled to the conductive loop 110 with an effective coupling coefficient. Effective coupling refers to the magnetic coupling between two circuits including coupling affected by other circuit(s). For example, the effective coupling of the resonant circuit 122 and the conductive loop 110 accounts for the influence of the conductive loop 110 and other resonant circuits 124 and 126. Effective coupling coefficient is a numeric representation of the degree of coupling and is in the range of −1 to 1. The value of the effective coupling coefficient is related to a number of factors, for example, the shape and size of the conductive loop, the relative position and orientation of the conductive loop to the resonant circuit, and the like. The absolute value of the effective coupling coefficient may be relatively low such that each of the plurality of resonant circuits (122, 124, and 126) has a distinctive resonant frequency, as illustrated in FIG. 1B.

The resonant circuit 122 includes an inductor $L_1$ and a capacitor $C_1$. The resonant circuit 124 includes an inductor $L_2$ and a capacitor $C_2$. The resonant circuit 126 includes an inductor $L_3$ and a capacitor $C_3$. A reader antenna 150, which is of a reader not illustrated, is configured to obtain the RF signals propagated from the RF device 100. With the design of low effective coupling of the inductive loop 110 and the resonant circuits (122, 124, and 126), the reader antenna 150 can read the respective resonant frequency of these three resonant circuits. In some embodiments, each of the resonant circuits (122, 124, and 126) has a first resonant frequency in free space and a second resonant frequency modified by the conductive loop 110. In some cases, frequency shift between the first resonant frequency and the second resonant frequency is less than 10% of the first resonant frequency. The RF device is configured to propagate a plurality of signals, where each of the plurality of signals is corresponding to one of the plurality of resonant circuits with a distinctive resonant frequency.

In some embodiments, the conductive loop 110 guides and modifies a plurality of signals generated by the plurality of resonant circuits (122, 124, and 126). In some embodiments, the absolute value of the effective coupling coefficient is less than 0.5. In some cases, the absolute value of the effective coupling coefficient is less than 0.4. In some cases, the absolute value of the effective coupling coefficient is less than 0.1. In some cases, the absolute value of the effective coupling coefficient is less than 0.05. In some cases, the absolute value of the effective coupling coefficient is less than 0.02. In some cases, each of the plurality of resonant circuits comprises an inductor and a capacitor.

In some embodiments, the inductor of a resonant circuit ($L_1$, $L_2$, and/or $L_3$) is electromagnetically coupled to the conductive loop 110. In some embodiments, the capacitor of a resonant circuit ($C_1$, $C_2$, and/or $C_3$) is electromagnetically coupled to the conductive loop 110. In some embodiments, the inductor of a resonant circuit ($L_1$, $L_2$, and/or $L_3$) is an antenna.

The conductive loop 110 and the antenna of the resonant circuit can have various arrangements, which are described in more detail below. In some embodiments, the conductive loop 110 and the antenna of the resonant circuit (122, 124, and/or 126) is generally in a same plane. In some embodiments, the conductive loop 110 and the antenna of the resonant circuit (122, 124, and/or 126) are in different planes. In some cases, the conductive loop 110 is generally in a first plane and the antenna is generally in a second plane, wherein an angle between the first plane and the second plane is greater than zero.

The conductive loop 110 may be formed in anyone of several ways. One method is to form the conductive loop 110 and the resonant circuit (122, 124, and/or 126) during manufacture, using the same operations that are used to manufacture the basic resonant circuit structure. In some implementations, the conductive loop 110, the resonant circuit (122, 124, and/or 126), and the reader antenna 150 can be made during a same manufacturing process. In such implementations, the coupling among these components may be better controlled than the components made in different processes. Examples of circuit-forming operations include but are not limited to, die cutting or patterning metal foil, electroplating conductive metals, printing conductive inks, printing precursor materials (e.g., metallo-organic compounds) that are reduced to a conductive state by subsequent heating or drying, and the like.

The RF device 100 may operate in a band of the electromagnetic spectrum defined by governmental regulations for electromagnetic radiation emissions. In some embodiments, the RF device is operating at a frequency below 100 MHz. In some cases, the RF device is operating at a frequency below 300 MHz. For example, the RF device 100 may operate at a frequency band centered at 50 MHz. In some applications, the RF device 100 may operate at a low frequency, for example, 500 KHz. In some cases, the RF device 100 may operate at a frequency in the range of 300 KHz-3 MHz. In some cases, the RF device 100 may operate at a frequency in the range of 30-300 KHz.

Figure 1C:
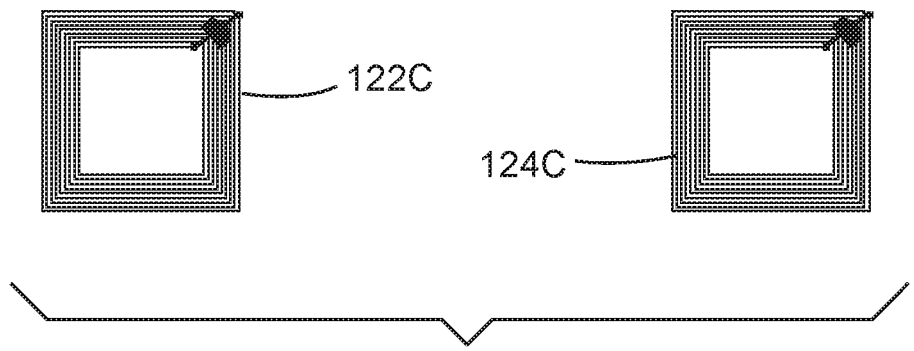
FIG. 1C shows a first and second inductive elements disposed close to each other.

FIG. 1C shows a first and second inductive elements (122C, 124C) disposed close to each other, for example, having a space of 1 cm in between. Coupling is a fraction of magnetic flux of the inductive element 122C that affects the magnetic field of the inductive element 124C, as illustrated in FIG. 1C, and is determinate from the geometry of the inductive elements. The inductive elements may be incorporated with a capacitive element to create a resonant circuit.

Figure 1D:
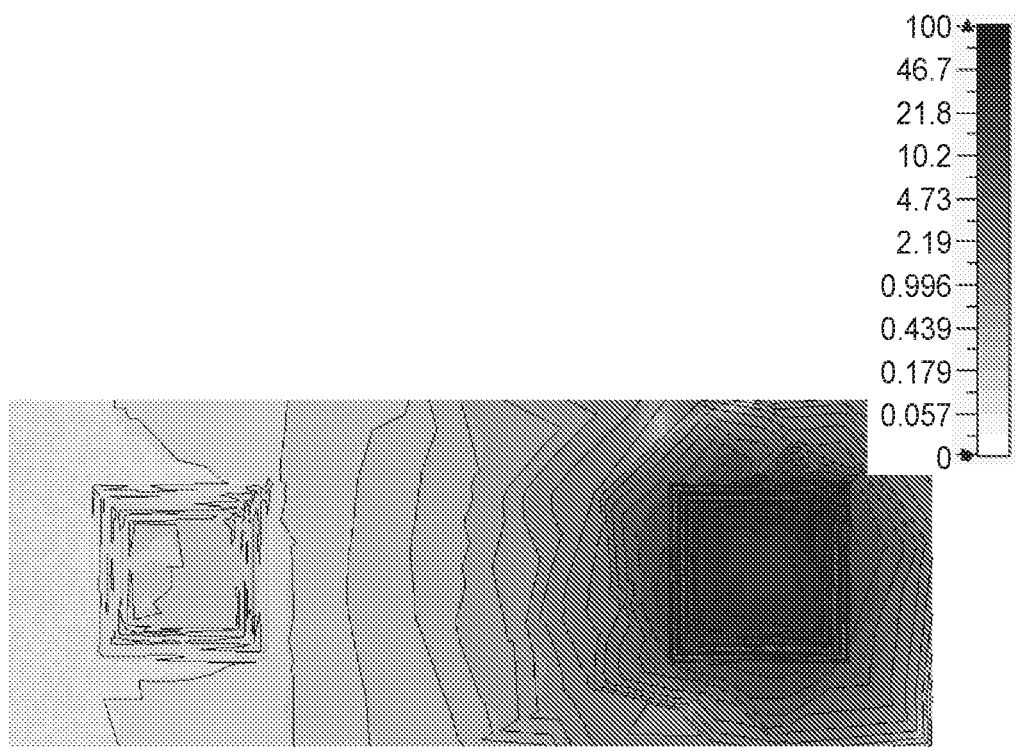
FIG. 1D illustrates the magnetic field of the circuit illustrated in FIG. 1C.
Figure 1E:
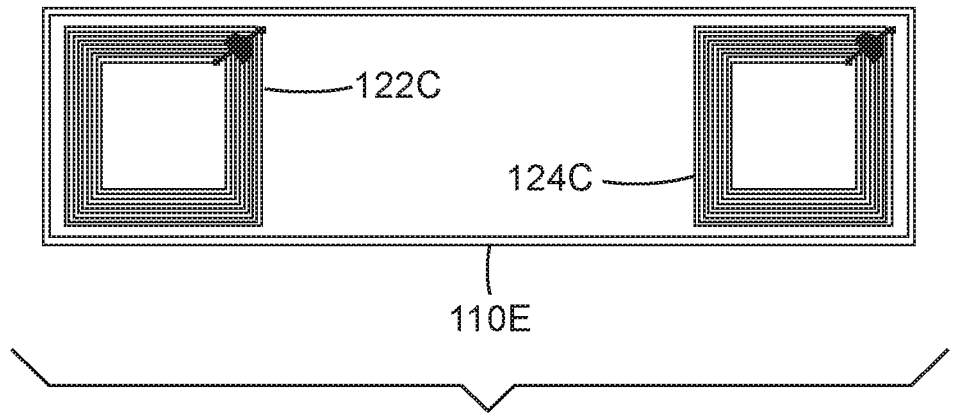
FIG. 1E shows a third inductive element, as a conductive loop to modify coupling between the first and second inductive elements illustrated in FIG. 1C.
Figure 1F:
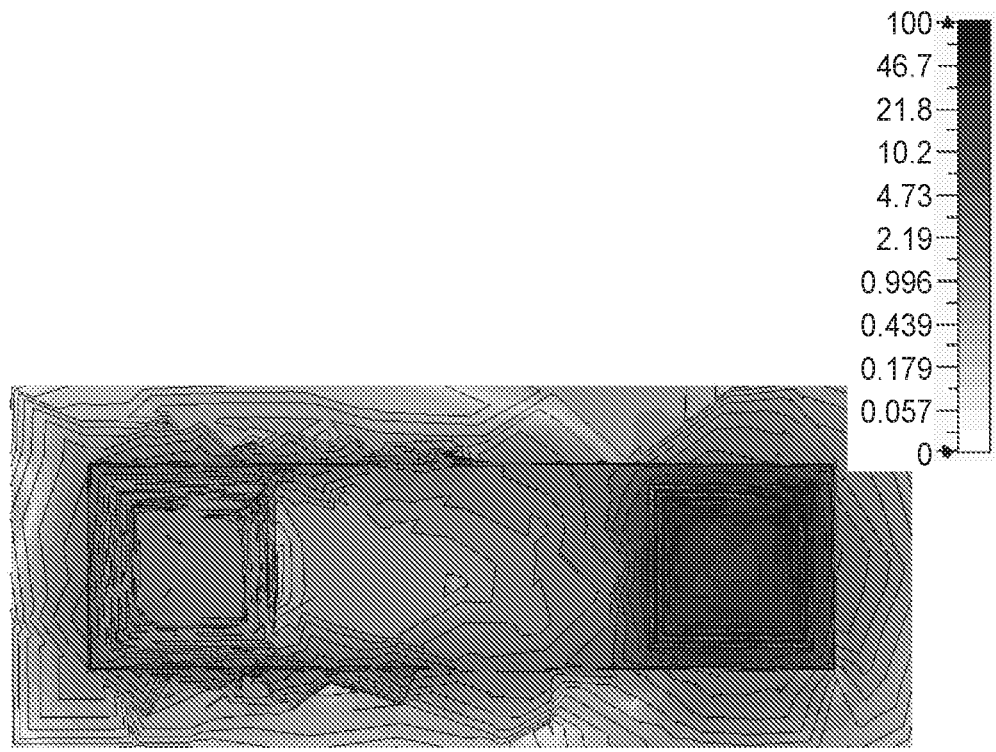
FIG. 1F illustrates the magnetic field of the circuit illustrated in FIG. 1E.

FIG. 1E shows a third inductive element 110E, as a conductive loop to modify coupling between the first and second inductive elements (122C, 124C), where the coupling is modified without a change of geometry of the first and second inductive elements (122C, 124C). FIG. 1F illustrates the magnetic field of the inductive elements (122C, 124C) and the conductive loop 110E. In comparison with FIG. 1D, the coupling of the inductive elements (122C, 124C) is changed. This capability is attractive in some applications, for example, where higher coupling between two inductive elements is desired but the geometry between the two inductive elements is fixed by system requirements.

Figure 1G:
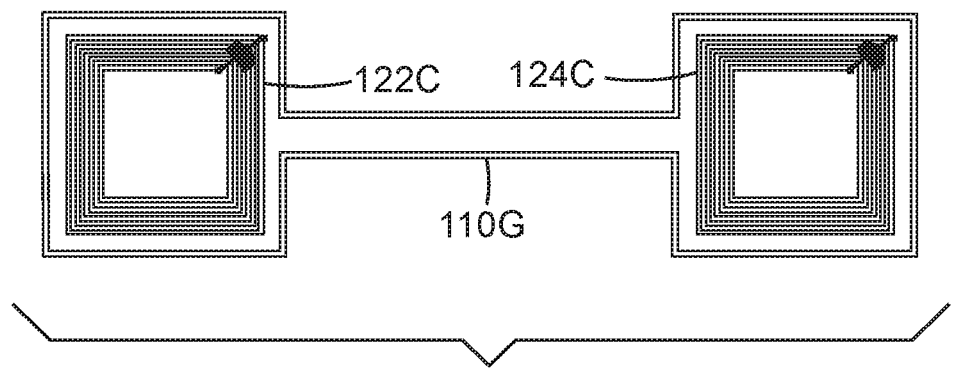
FIG. 1G shows another example of a conductive loop modifying coupling between the first and second inductive elements illustrated in FIG. 1C.
Figure 1H:
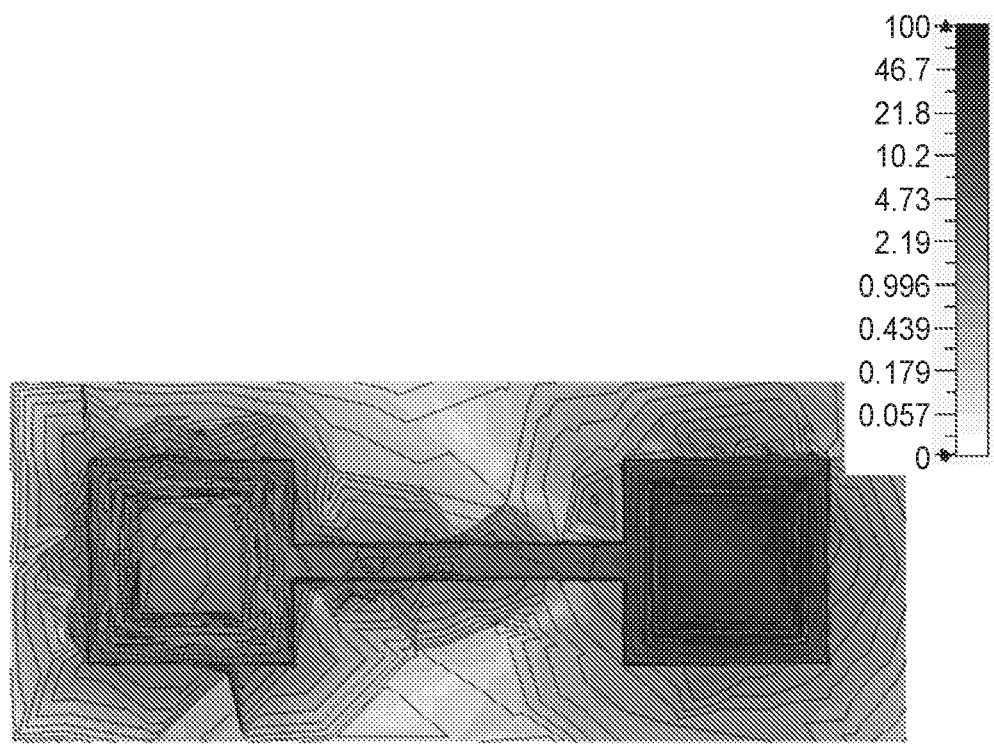
FIG. 1H illustrates the magnetic field of the circuit illustrated in FIG. 1G.

As described above, if the geometry of a system containing two inductive elements is known, coupling between the inductive elements can be experimentally measured or modeled. Inductive coupling coefficient from modelling results can be determined by:

$$k_I = -\frac{\text{imag}(Z_{12})}{2\pi f L} \quad (1)$$

where $k_I$ is the inductive coupling coefficient, $\text{imag}(Z_{12})$ is the imaginary part of $Z_{12}$ (part of the impedance matrix), f is the frequency, and L is the inductance of an inductive element. FIG. 1G shows another example of a conductive loop 110G modifying coupling between the first and second inductive elements (122C, 124C), where the conductive loop 110G is narrower at the portion between the inductive elements than the portions overlapping with the inductive elements. FIG. 1H illustrates the magnetic field of the inductive elements (122C, 124C) and the conductive loop 110G. Table 1 below provides a comparison of coupling coefficients of circuits illustrated in FIGS. 1C, 1E, and 1G, at 10 MHz, with the inductance of the two inductive loops (122C, 124C) as $1.45 \times 10^{-6}$ H.

TABLE 1

|  | Inductance (µH) | imag($Z_{12}$) @10 MHz (Ohms) | Coupling Coefficient |
|---|---|---|---|
| Circuit in FIG. 1C | 1.45 | 0.0924 | 0.001 |
| Circuit in FIG. 1E | 1.45 | 3.615 | 0.040 |
| Circuit in FIG. 1G | 1.45 | 4.824 | 0.054 |

Figure 2A:
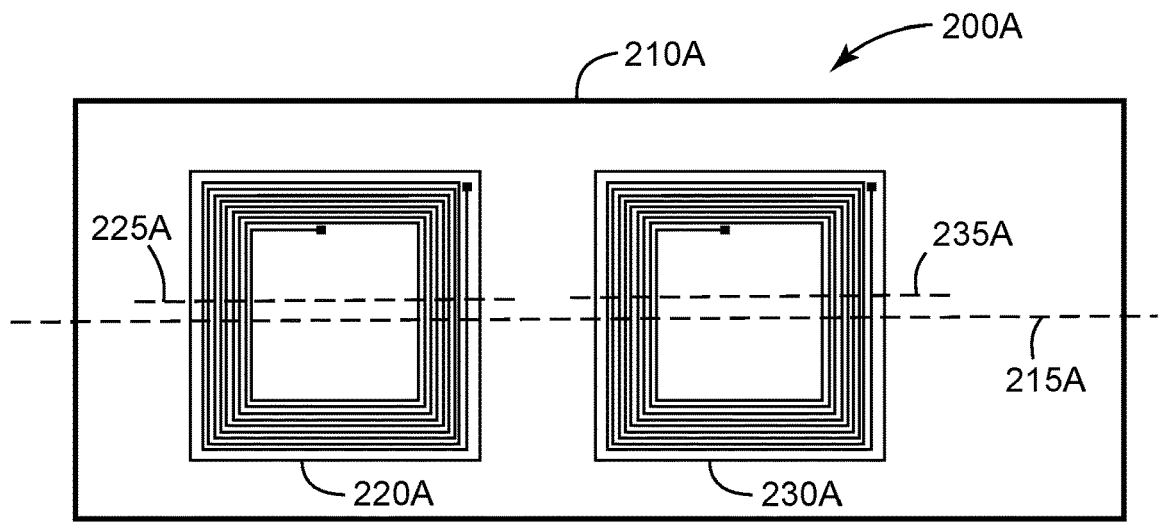
FIGS. 2A-2G illustrate various examples of RF devices having the conductive loop and antennas of resonant circuits.
Figure 2B:
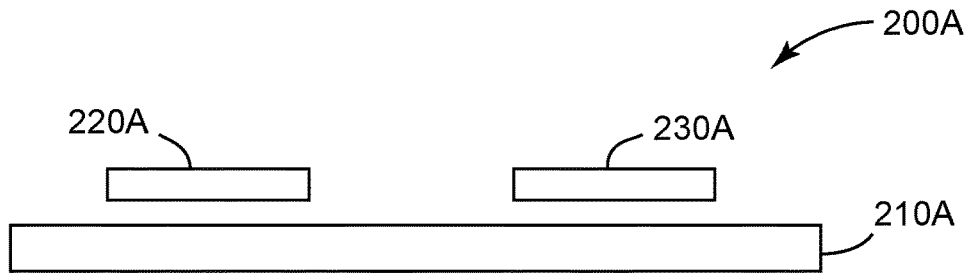

FIGS. 2A-2G illustrate various examples of RF devices having the conductive loop and antennas of resonant circuits. FIG. 2A shows a top view of one example of an RF device 200A; FIG. 2B illustrates a side view of the RF device 200A. The RF device 200A includes a conductive loop 210A and resonant circuits 220A and 230A. The conductive loop 210A having an axis 215A that is substantially aligned with the axis 225A of the antenna of the resonant circuit 220A and/or the axis 235A of the antenna of the resonant circuit 230A. That is, the axis 215A of the conductive loop 210A is substantially parallel to the axis of 225A and/or 235A. As illustrated in FIG. 2B, the conductive loop 210A and the resonant circuits (220A, 230A) are not in the same plane.

Figure 2C:
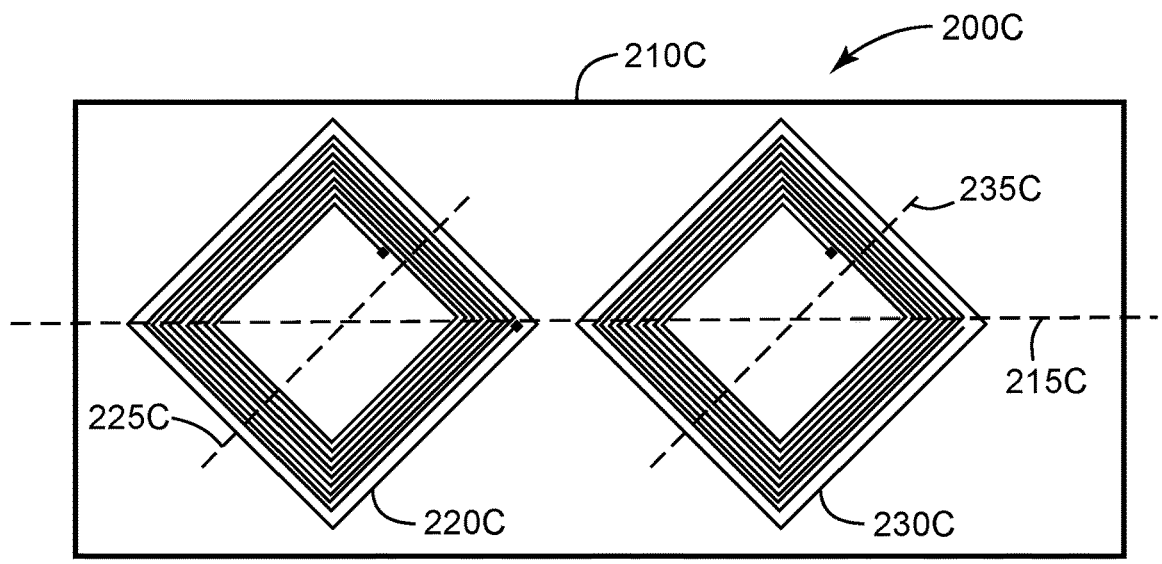

FIG. 2C shows another example of an RF device 200C having a conductive loop 210C having an axis 215C at an "offset angle" of approximately 45 degrees with respect to the axis 225C of the antenna of the resonant circuit 220C and/or the axis 235C of the antenna of the resonant circuit 230C. The offset angle can reduce the effective coupling between the conductive loop 210C and the resonant circuits (220C, 230C). In some cases, the conductive loop 210C and the resonant circuits (220C and/or 230C) are in the same plane. In some cases, the conductive loop 210C and the resonant circuits (220C and/or 230C) are not in the same plane.

Figure 2D:
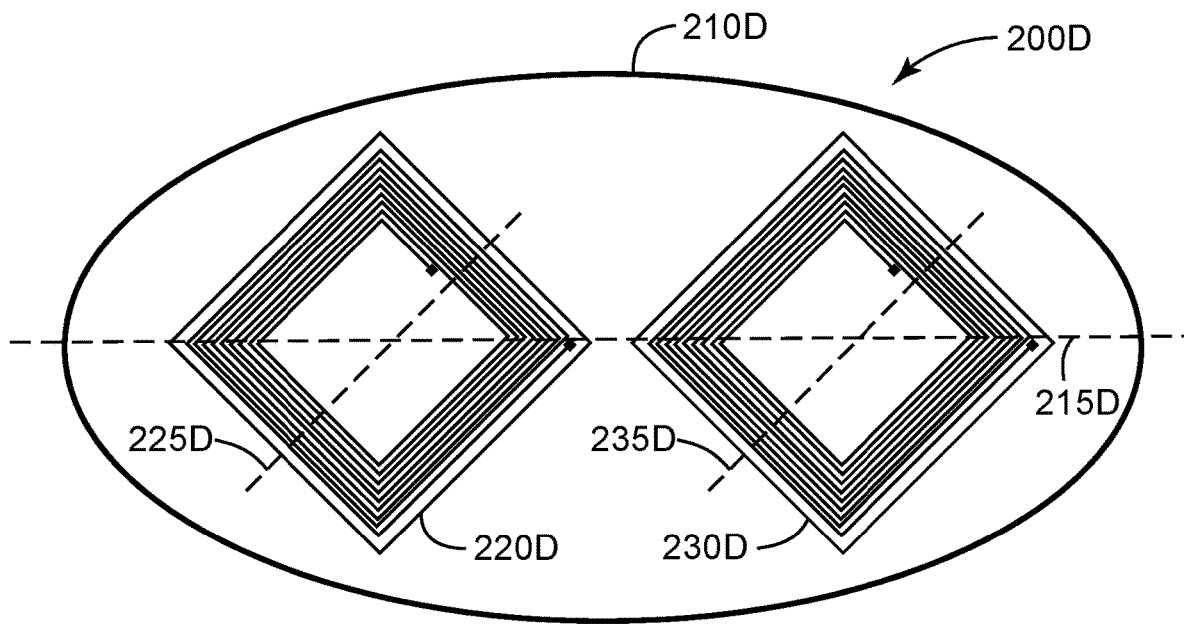

FIG. 2D illustrates another example of an RF device 200D. In this example embodiment, the RF device 200D includes a conductive loop 210D and resonant circuits 220D and 230D. As illustrated, the conductive loop 210D has an oval shape, rather than a rectilinear shape as those described above with respect to FIGS. 2A and 2C. In some embodiments, the conductive loop may take virtually any other shape, including triangular, elliptical, square, rectangular, or any of a myriad of other multi-sided or smoothly-sided closed shapes and still perform the coupling effect.

Figure 2E:
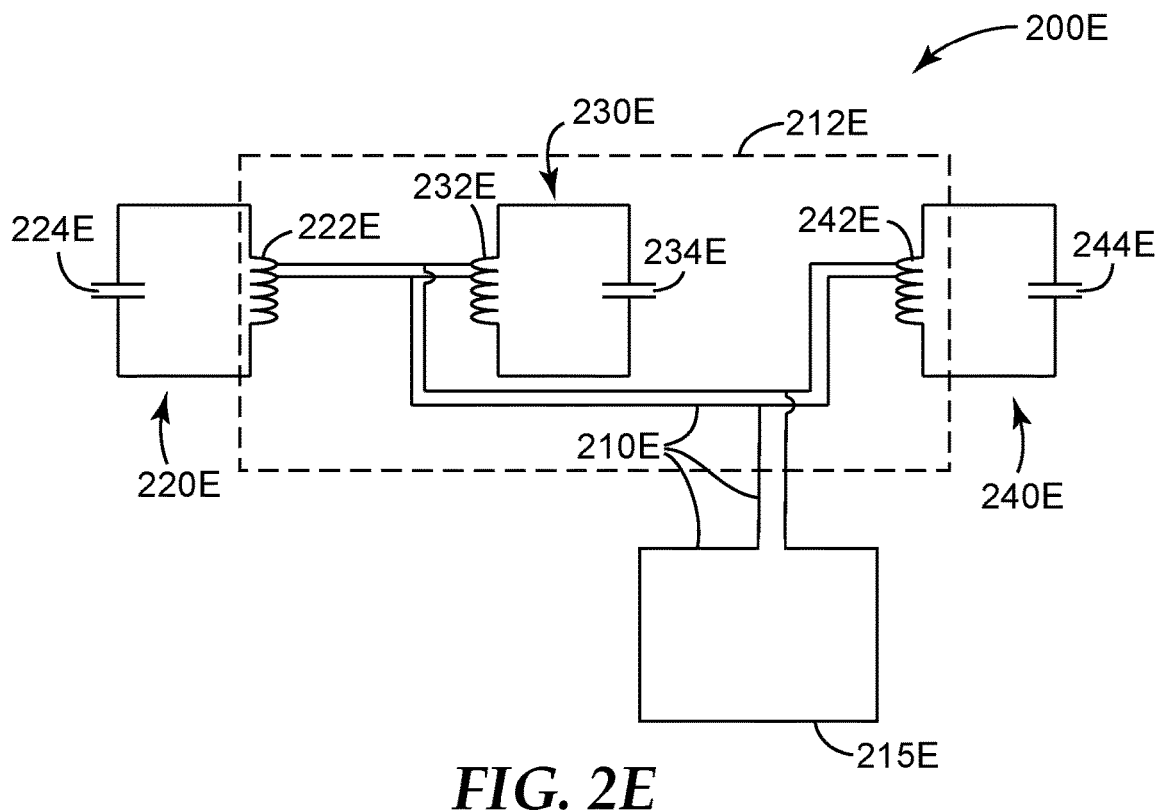

FIG. 2E illustrates yet another example of an RF device 200E. In this example, the RF device 200E includes resonant circuits 220E, 230E, 240E, and a conductive loop 210E. The resonant circuit 220E includes an inductor 222E and a capacitor 224E. The resonant circuit 230E includes an inductor 232E and a capacitor 234E. The resonant circuit 240E includes an inductor 242E and a capacitor 244E. In the example illustrated, the conductive loop 210E is galvanically connected to a portion of each of the inductors (222E, 232E, 242E). In some cases, the conductive loop 210E is galvanically connected to, for example, 10% of the inductance loop of an inductor. In alternative embodiments, the conductive loop can be galvanically connected to a portion of each of the capacitors. In some cases, the conductive loop 210E can be connected to an inductor or a capacitor in parallel or in series.

In some cases as illustrated, the conductive loop 210E may include a device portion 212E that is coupled to the resonant circuits and a read-out portion 215E that is configured to couple to a reader antenna. In some cases, the read-out portion 215E is spaced apart, for example, 5 mm to 50 mm, from the device portion 212E such that a reader will not interact with the resonant circuits. In some cases, the read-out portion 215E can be disposed according the application such that it is easily coupled with a reader antenna.

Figure 2F:
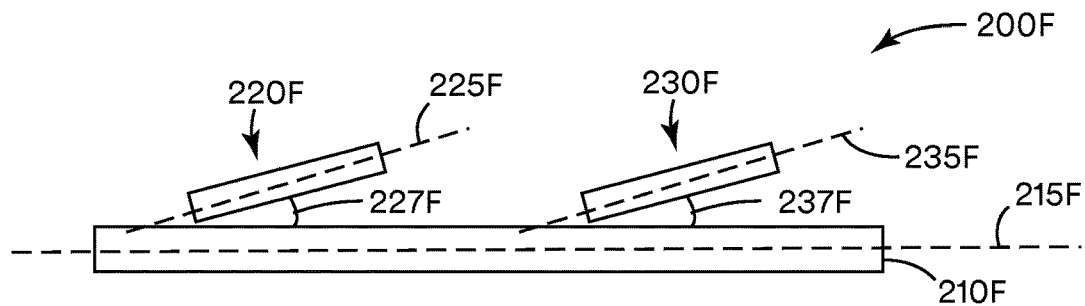

FIG. 2F shows a side view of yet another example of an RF device 200F. The RF device 200F includes a conductive loop 210F and resonant circuits 220F and 230F. The conductive loop 210F is disposed in a plane projected as 215F, and the resonant circuit 220F is disposed in a plane projected as 225F and the resonant circuit 230F is disposed in a plane projected as 235F. The plane 225F is diverged from the plane 215F with an angle 227F. The plane 235F is diverged from the plane 215F with an angle 237F.

Figure 2G:
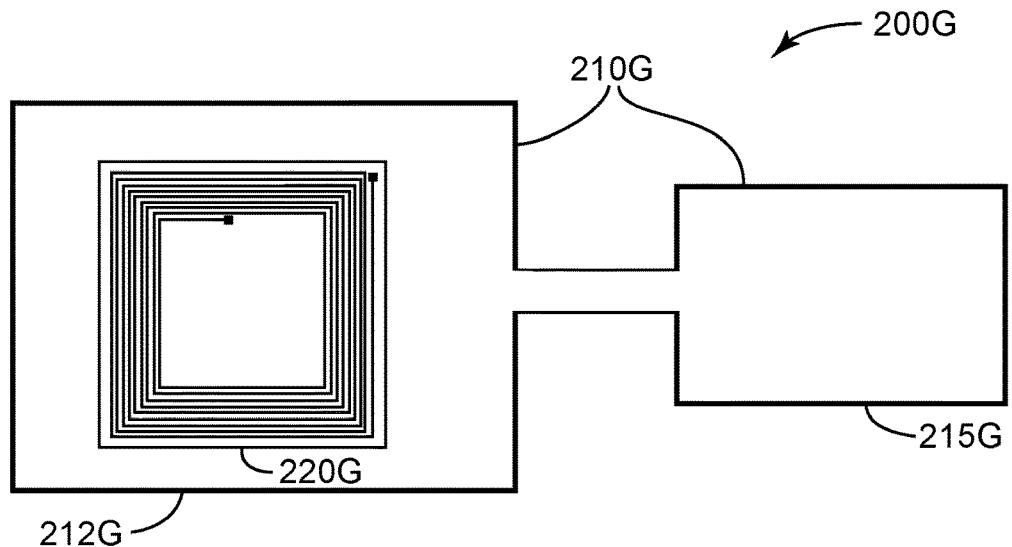

The examples above show a conductive loop coupled with more than one resonant circuit. In one embodiment as illustrated in FIG. 2G, an RF device 200G may include one or more resonant circuits 220G and a closed conductive loop 210G. The conductive loop 210G, as illustrated, includes two portions, a first portion 212G proximate to the resonant circuits 220G and a second portion 215G is away from the resonant circuits 220G. The second portion 215G may be disposed at a distance from the resonant circuits such that when the second portion 215G is coupled with a reader antenna, the reader's components will have minimum affect to the operation of the resonant circuits. For example, the first portion 212G and the second portion 215G has a gap of 1 cm in between. Each of the first portion 212G and the second portion 215G may use any of the configurations describe herein.

Figure 2H:
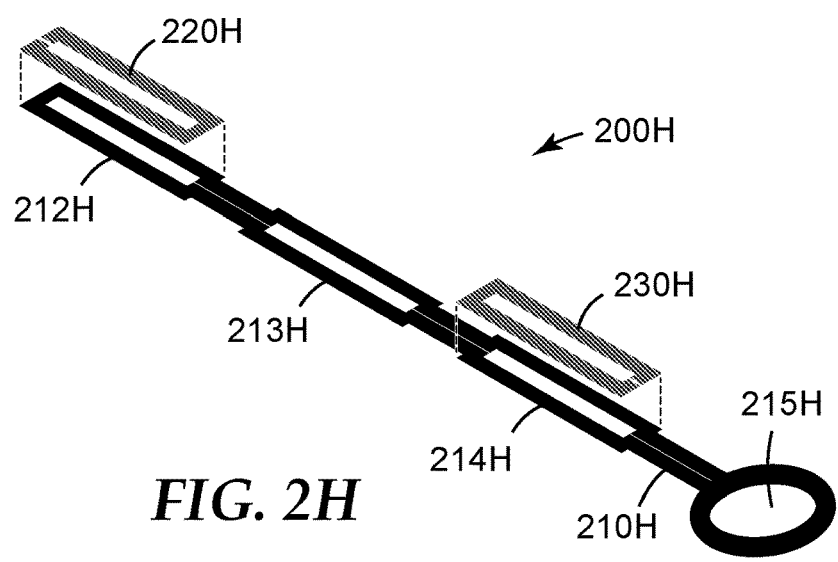
FIG. 2H illustrates an exploded view of an RF device.
Figures 1, 2H:
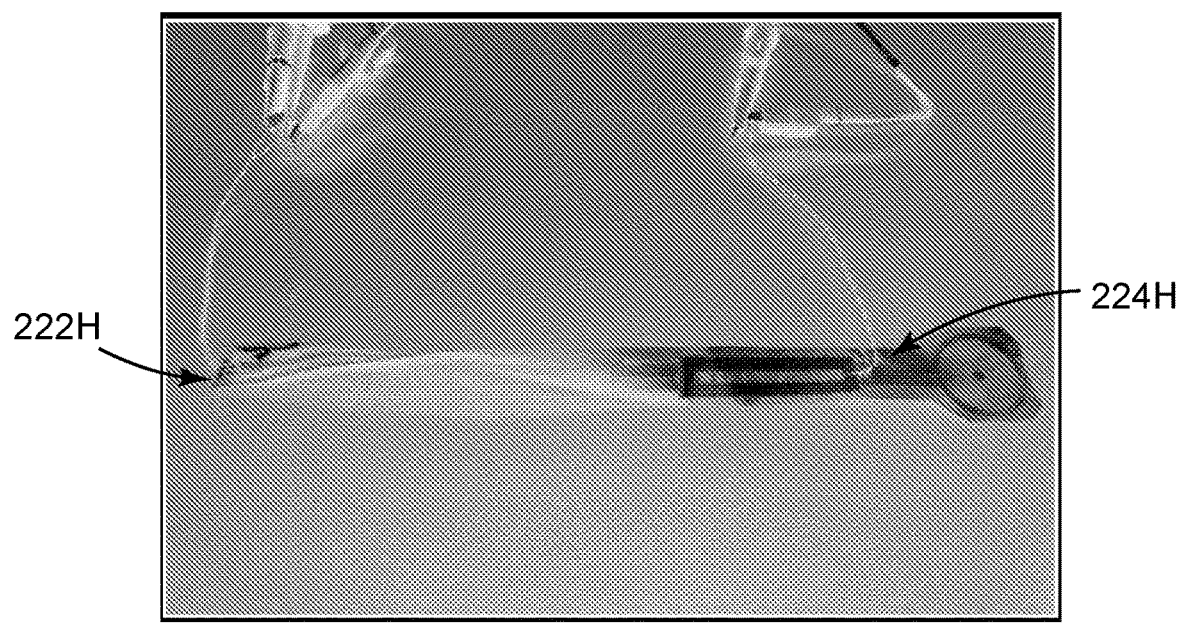
Figures 2, 2H:
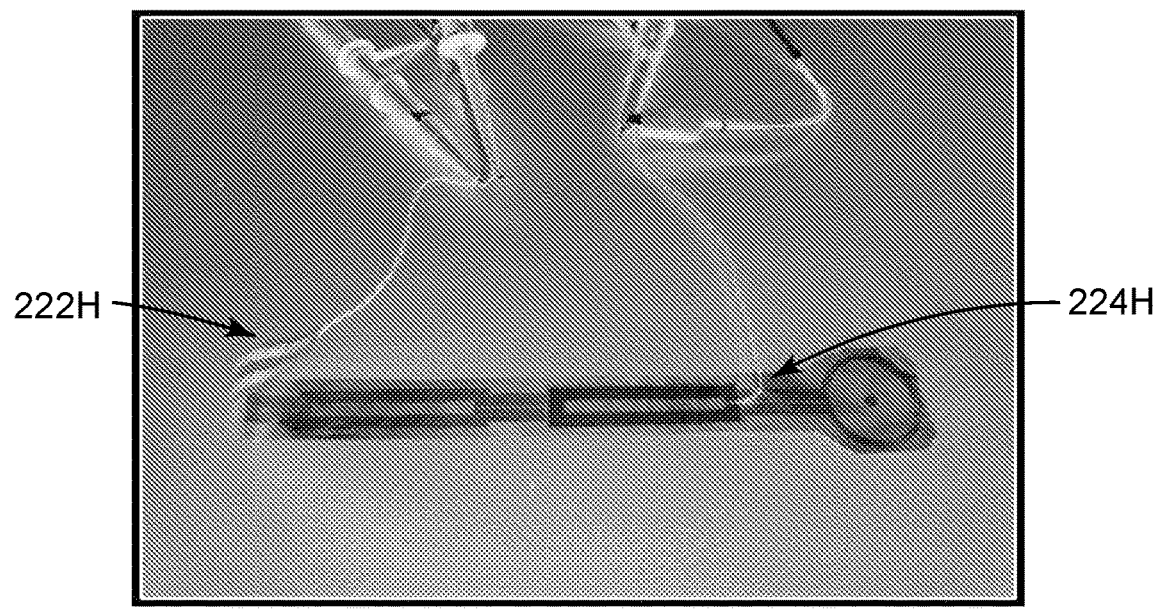

FIG. 2H illustrates an exploded view of an RF device 200H. The RF device 200H may include resonant circuits (220H, 230H) and a closed conductive loop 210H. The conductive loop 210H, as illustrated, includes four portions, a first portion 212H proximate to the resonant circuit 220H, a second portion 213H, a third portion 214H proximate to the resonant circuit 230H, and a fourth portion 215H. The fourth portion 215H may be disposed at a distance from the resonant circuits such that when the fourth portion 215H is coupled with a reader antenna, the reader's components will have minimum affect to the operation of the resonant circuits. The resonant circuits (220H, 230H) can be disposed at a plane different from the plane of the conductive loop 210H. For example, the resonant circuit 220H may be attached to the first portion 212H via an adhesive. In some cases, the RF device 200H can be twisted and bent as illustrated in FIGS. 2H-1 and 2H-2, where the coupling coefficient indicative by the ratio of the measured voltage at 224H to the applied voltage at 222H remained unchanged. As an example, the applied voltage at 222H is 2V and the measure voltage at 224H is 0.18V.

Figure 3A:
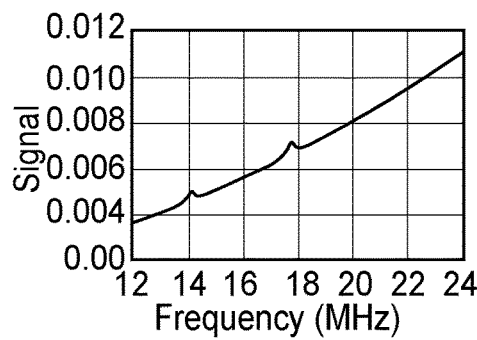
FIGS. 3A-3H are resonant frequency graphs illustrating how coupling may affect the conductive loop's output signal respective to each individual resonant circuit.
Figure 3B:
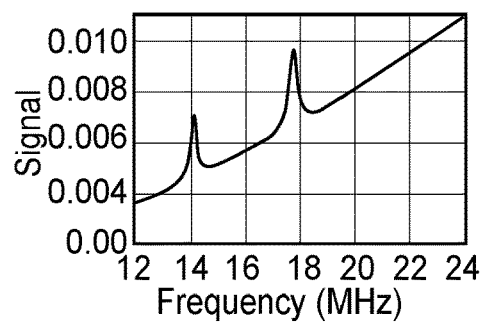
Figure 3C:
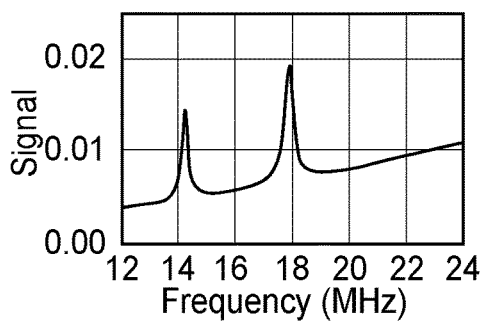

FIGS. 3A-3H are resonant frequency graphs illustrating how coupling may affect the conductive loop's output signal respective to each individual resonant circuit. In this set of examples, two resonant circuits (R1 and R2) are coupled with the conductive loop. The resonant circuit R1 has a resonant frequency of 14 MHz at free space and the resonant circuit R2 has a resonant frequency of 18 MHz at free space. FIG. 3A illustrates an output signal of the conductive loop with coupling coefficient of 0.02. With low coupling coefficient, the frequency shift of the output signal from the free space resonant frequency of the respective resonant circuit is very low and the amplitude corresponding to the respective resonant circuit is also low. FIG. 3B illustrates an output signal of the conductive loop with coupling coefficient of 0.05. FIG. 3C illustrates an output signal of the conductive loop with coupling coefficient of 0.1.

Figure 3D:
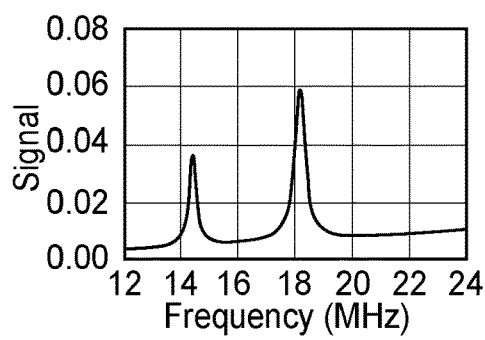
Figure 3E:
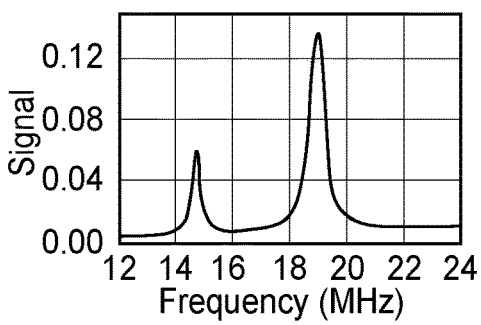
Figure 3F:
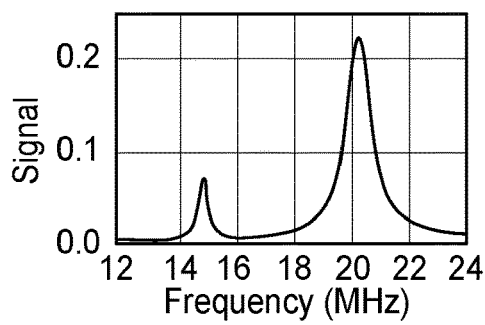
Figure 3G:
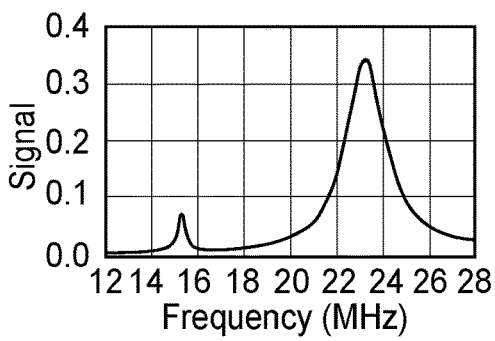
Figure 3H:
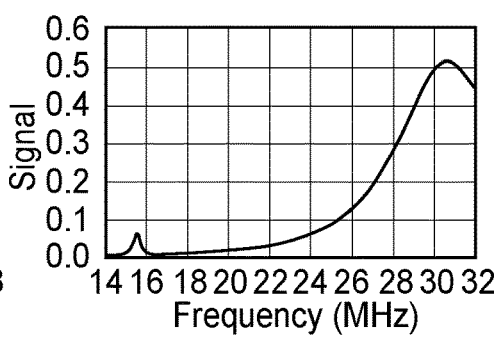

FIG. 3D illustrates an output signal of the conductive loop with coupling coefficient of 0.2. In this example, the frequency shift of the output signal from the free space resonant frequency of the respective resonant circuit becomes higher and the amplitude corresponding to the respective resonant circuit is also larger. FIG. 3E illustrates an output signal of the conductive loop with coupling coefficient of 0.3. FIG. 3F illustrates an output signal of the conductive loop with coupling coefficient of 0.4. FIG. 3G illustrates an output signal of the conductive loop with coupling coefficient of 0.5. FIG. 3H illustrates an output signal of the conductive loop with coupling coefficient of 0.6. In this example, the frequency shift of the output signal from the free space resonant frequency of the respective resonant circuit is significant. In some embodiments, the coupling efficient is limited to 0.5.

In some embodiments, the output signals with known coupling coefficient may be compensated to provide accurate measurements. In some cases, when coupling coefficient is relative high, for example, greater than 0.5, one resonant circuit may have an impact to another resonant circuit. In such cases, resonant frequency can be compensated to provide accurate measurements. In some implementations, it may be desirable to compensate for an environmental condition that modifies a parameter of a sensor resonant circuit.

In one example, an environmental condition may be compensated by removing its effect on the sensor resonant circuit. After compensation, a second environmental condition may be measured by a parameter change of the sensor resonant circuit. Examples of environmental condition that may be compensated include temperature, local dielectric constant change, physical change of sensor resonant circuit, coupling change between two or more resonant circuits, a local conductivity change of the surrounding environment, and the like.

Figure 4A:
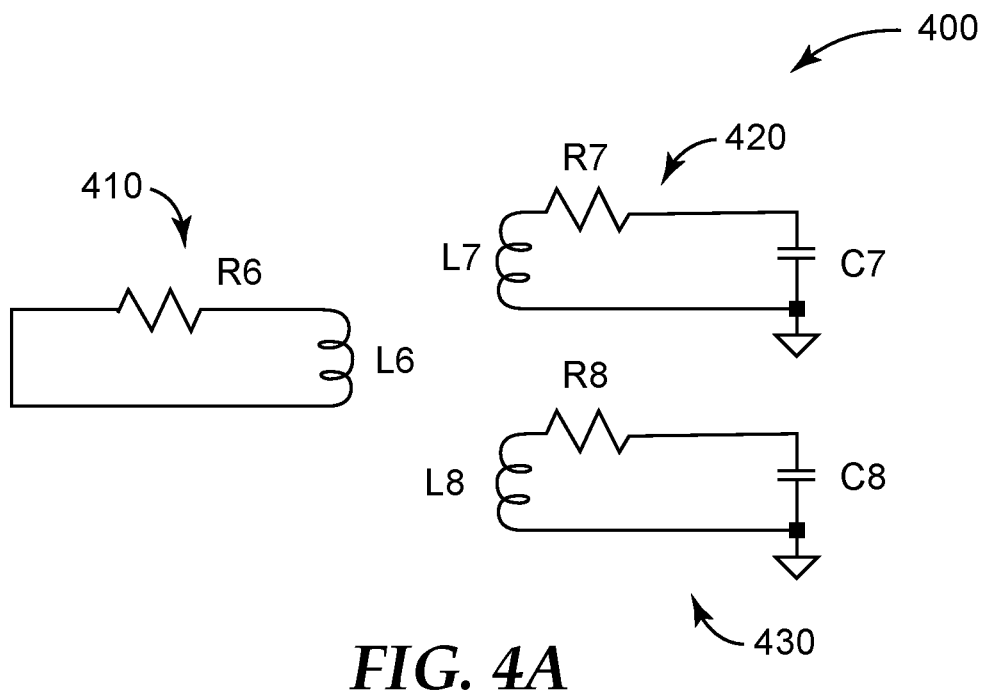
FIG. 4A is a schematic diagram of an RF device.

FIG. 4A is a schematic diagram of an RF device 400 including a conductive loop 410 coupled with two resonant circuits 420 and 430. The conductive loop 410 includes a resister R6 and an inductor L6. The resonant circuit 420 includes an inductor L7, a resistor R7, and a capacitor C7. The resonant circuit 430 includes an inductor L8, a resistor R8, and a capacitor C8. In one example, the components have values listed in Table 2 below. The inductor L7 may have various inductance value due to environmental condition changes to be compensated. For example, the resonant circuits 420, 430 are designed to have a resonant frequency shift during the application of a normal force. With the application of a normal force (compression), the resonant frequency of the resonant circuits increases with a known relationship with the applied normal force. The coupling of the resonant circuits 420, 430 are increased by the presence of the conductive loop 410, and the resonant frequencies of the resonant circuits are measured by a reader (not illustrated in FIG. 4A) that is coupled to the conductive loop 410. In this example, the baseline resonant frequencies of the resonant circuits are determined in the absence of an applied normal force. The applied normal forces may be determined by the relative shift in resonant frequency from their respective baseline values and a known relationship between frequency shift and applied force.

Figure 4B:
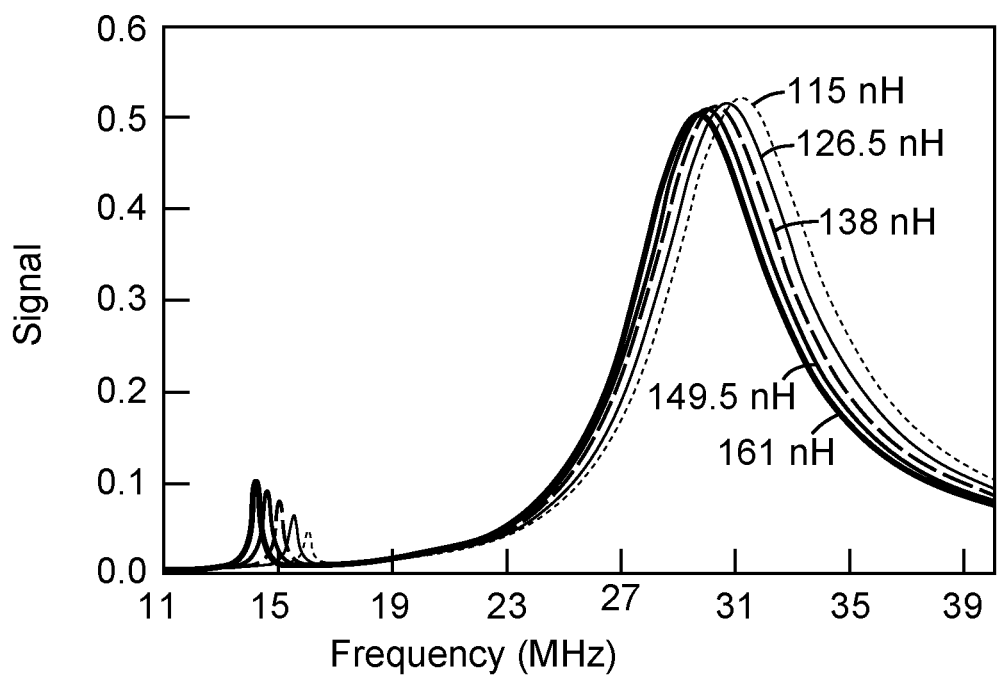
FIG. 4B illustrates resonant frequencies of resonant circuits under various conditions.

In this example, as shown in Table 2, four normal forces are applied to the resonant circuit 420 and no force is applied to the resonant circuit 430. In an alternative example, the resonant circuit 420 can be sensitive to an environment condition change and the resonant circuit 430 can be insensitive to an environment condition change. In this example, inductance of L7 is increased by 10% for each simulated applied forces. As expected, the simulated resonant frequency of circuit 430 decreases as the inductance increased. Although L8 was held constant during the simulation, the resonant frequency of resonant circuit 430 is decreased, which is caused by the coupling between resonant circuits 420 and 430 by the conductive loop 410. To compensate and remove this effect, a correction factor versus resonant frequency shift of resonant circuit 420 may be used. In this example, the correction factor of resonant circuit 420 can be determined by circuit simulation or can be determined using additional methods including modeling and experimental methods. FIG. 4B illustrates resonant frequencies of resonant circuits 420 and 430 under various conditions listed in Table 2. Table 2 shows simulated resonant frequencies of resonant circuit 430, correction factors determined based on the frequency shift of resonant circuit 420, and the corrected resonant frequencies of resonant circuit 430. In some cases, the correction factors can be proportional to frequency shift from baseline frequency, for example, 0.8 times the frequency shift for each respective condition. As provided in Table 2, the corrected frequencies of resonant circuit 430 remain constant, as expected because no force was applied to resonant circuit 430.

In one embodiment, applied normal forces, or other environmental conditions, such as temperature, moisture, chemical presence, or the like, may be applied to both resonant circuits. Correction factors can be determined by frequency shift of resonant circuit 420 and the correction factor can be used to determine a corrected resonant frequency shift of resonant circuit 430. From the resonant frequency shift of resonant circuit 420 and the corrected resonant frequency shift of resonant circuit 430, the applied forces to both the resonant circuits can be determined through a known relationship between frequency shift and applied force.

TABLE 2

| Parameters | L7 (nH) | L8 (nH) | C7=C8 (nF) | Simulated Frequency for Circuit 420 (MHz) | Correction Factor (MHz) | Simulated Frequency for Circuit 430 (MHz) | Corrected Frequency of Circuit 430 (MHz) |
|---|---|---|---|---|---|---|---|
| Baseline | 115 | 80 | 1 | 16.006 | 0.0 | 31.089 | 31.089 |
| Force 1 | 126.5 | 80 | 1 | 15.502 | −0.481 | 30.608 | 31.089 |
| Force 2 | 138 | 80 | 1 | 15.038 | −0.870 | 30.219 | 31.089 |
| Force 3 | 149.5 | 80 | 1 | 14.603 | −1.189 | 29.900 | 31.089 |
| Force 4 | 161 | 80 | 1 | 14.196 | −1.456 | 29.633 | 31.089 |

In some embodiments, an RF device can include sensing element(s) that is integrated with or connected to the resonant circuits and become a sensing device. In some cases, the sensing elements may be responsive or sensitive to environmental conditions. In some implementations, a sensing element can change its permittivity, permeability, and/or electrical conductivity in response to environmental conditions. For example, a sensing element can expand or contract in response to pressure changes. As another example, a sensing element can change its dielectric property in response to moisture variation. The examples of these sensing elements can be disposed in the capacitor and/or inductor such that the capacitance and/or the inductance of the resonant circuit is changed.

Figure 5:
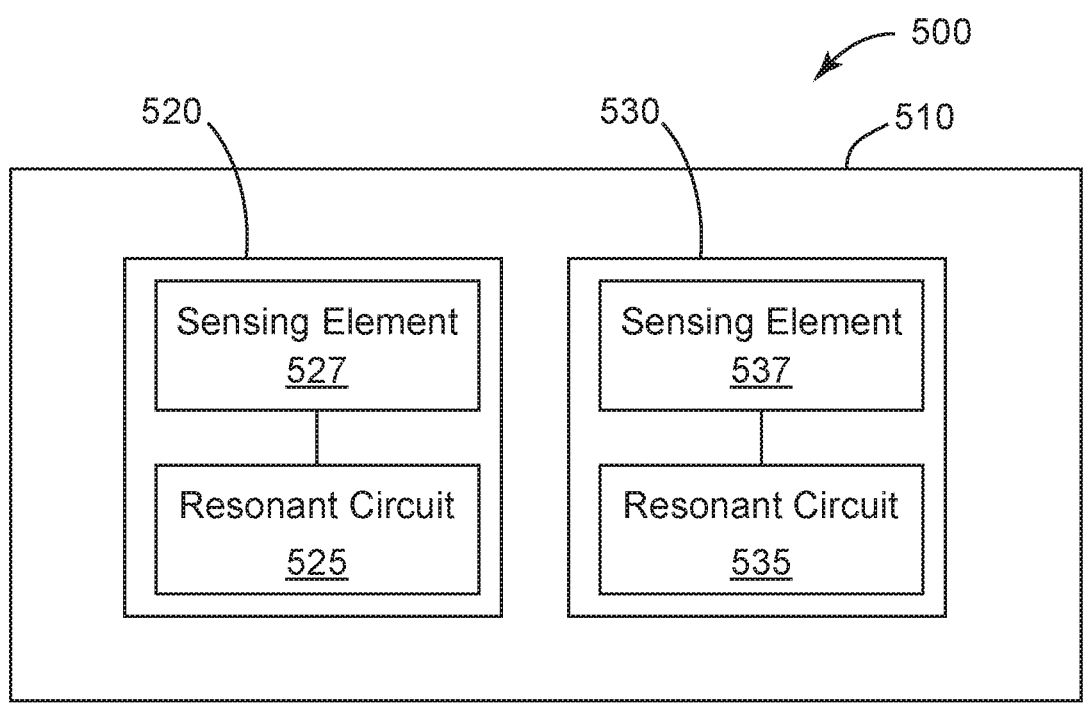
FIG. 5 illustrates one embodiment of a sensing device using a conductive loop.

FIG. 5 illustrates one embodiment of a sensing device 500 using a conductive loop. The sensing device 500 includes a conductive loop 510, a first sensor 520 having a first sensing element 527 integrated with or coupled to a first resonant circuit 525, and a second sensor 530 having a second sensing element 537 integrated with or coupled to a second resonant circuit 535. The sensing device 500 can use any one of the configurations of the RF device described herein. In some applications, the first sensor can be disposed a first location and the second sensor can be disposed at a second location different from the first location, such that the sensing device 500 can provide sensing signals relevant to these two locations. In some applications, the first sensor 510 may not include the first sensing element 527 such that the first sensor 510 can provide baseline information.

EXAMPLES

Conductive Loop with Resonant Circuit Assembly 3313 copper foil tape obtained from 3M Company of St. Paul, Minn. was used to assemble a 10.2 cm×40.6 cm conductive loop which was adhered to an X-ACTO X7761 30.5 cm×45.7 cm self-healing polyvinyl chloride (PVC) mat obtained from Elmer's Products, Inc of Westerville, Ohio by 3M Scotch™ 373 packing tape obtained from 3M Company of St. Paul, Minn. The copper tape was soldered at the corners to create an electrically conductive loop. A 5 cm×5 cm 3M ISO RFID tag, with a resonant frequency of 13.9 MHz, was placed within the conductive loop at one end. A modified miniVNA PRO obtained from W4RT Electronics of Huntsville, Ala. with a custom 2-turn 1 cm radius copper antenna was used as the reader and placed on the within the conductive loop on the opposite end of the ISO RFID tag. The reader and ISO RFID tag were separated by a distance of 1.3 and 33.0 cm. The real part of the impedance was measured as a function of frequency for the reader and RFID for both distances with and without the presence of the conductive loop. Results are found in Table 3. The output power of the miniVNA PRO was 0 dBm.

TABLE 3

| Separation Distance | Conductive Loop | Resonant Frequency | Impedance ($\Omega$) @ Resonance |
|---|---|---|---|
| 1.3 cm | No | 13.9 MHz | 55.0 |
| 33.0 cm | No | Not Detected | 0.6 |
| 33.0 cm | Yes | 13.9 MHz | 2.0 |

Example Embodiments

Item A1. An RF device, comprising:
a closed conductive loop, and
a plurality of resonant circuits, each of the plurality of resonant circuits electromagnetically coupled to the conductive loop with an effective coupling coefficient,
wherein the effective coupling coefficient has a relative low absolute value such that each of the plurality of resonant circuits has a distinctive resonant frequency.

Item A2. The RF device of Item A1, wherein each of the plurality of resonant circuits has a first resonant frequency in free space and a second resonant frequency modified by the conductive loop.

Item A3. The RF device of Item A2, wherein frequency shift between the first resonant frequency and the second resonant frequency is less than 10% of the first resonant frequency.

Item A4. The RF device of any one of Item A1-A3, wherein the RF device is configured to propagate a plurality of signals, each of the plurality of signals corresponding to one of the plurality of resonant circuits.

Item A5. The RF device of any one of Item A1-A4, wherein the absolute value of the effective coupling coefficient is less than 0.5.

Item A6. The RF device of any one of Item A1-A5, wherein the absolute value of the effective coupling coefficient is less than 0.4.

Item A7. The RF device of any one of Item A1-A6, wherein the absolute value of the effective coupling coefficient is less than 0.1.

Item A8. The RF device of any one of Item A1-A7, wherein the absolute value of the effective coupling coefficient is less than 0.05.

Item A9. The RF device of any one of Item A1-A8, wherein the absolute value of the effective coupling coefficient is less than 0.02.

Item A10. The RF device of any one of Item A1-A9, wherein each of the plurality of resonant circuits comprises an inductor and a capacitor.

Item A11. The RF device of Item A10, wherein the inductor is electromagnetically coupled to the conductive loop.

Item A12. The RF device of Item A10, wherein the capacitor is electromagnetically coupled to the conductive loop.

Item A13. The RF device of Item A10, wherein the inductor is an antenna.

Item A14. The RF device of Item A13, wherein the conductive loop and the antenna is generally in a same plane.

Item A15. The RF device of Item A13, wherein the conductive loop and the antenna is in a different plane.

Item A16. The RF device of Item A13, wherein the conductive loop is generally in a first plane and the antenna is generally in a second plane, wherein an angle between the first plane and the second plane is greater than zero.

Item A17. The RF device of Item A13, wherein the conductive loop and the antenna have a different shape from each other.

Item A18. The RF device of Item A10, wherein the conductive loop is galvanically connected to a portion of the inductor.

Item A19. The RF device of Item A10, wherein the conductive loop is galvanically connected to a portion of the capacitor.

Item A20. The RF device of any one of Item A1-A19, wherein a first resonant circuit of the plurality of resonant circuits has a first circuit resonant frequency and a second resonant circuit of the plurality of resonant circuits has a second circuit resonant frequency, wherein a difference between the first resonant frequency and the second resonant frequency is at least the first resonant frequency divided by a quality factor of the first resonant circuit.

Item B1. A sensor system, comprising:
a sensing unit configured to detect environmental conditions, and
an RF circuit, comprising:
a closed conductive loop, and
one or more resonant circuits electromagnetically coupled to the conductive loop with an effective coupling coefficient, wherein at least one of the one or more resonant circuits is electromagnetically coupled to the sensing unit and configured to receive a sensing signal from the sensing unit, and wherein the RF circuit is configured to transmit the sensing signal.

Item B2. The sensor system of Item B1, wherein the sensing unit comprises a plurality of sensing elements.

Item B3. The sensor system of Item B2, wherein each of the plurality of the sensing elements is electrically coupled to one of the one or more resonant circuits.

Item B4. The sensor system of Item B3, wherein each of the plurality of the sensing elements generates an output signal, and wherein the corresponding one of the one or more resonant circuits is configured to receive the output signal and transmit the output signal.

Item B5. The sensor system of any one of Item B1-B4, wherein each of one or more resonant circuits has a first resonant frequency in free space and a second resonant frequency modified by the conductive loop.

Item B6. The sensor system of Item B5, wherein frequency shift between the first resonant frequency and the second resonant frequency is less than 10% of the first resonant frequency.

Item B7. The sensor system of any one of Item B1-B6, wherein the RF circuit is configured to propagate a plurality of signals, each of the plurality of signals corresponding to one or more resonant circuits.

Item B8. The sensor system of any one of Item B1-B7, wherein the effective coupling coefficient has a relative low absolute value such that each of one or more resonant circuits has a distinctive resonant frequency.

Item B9. The sensor system of Item B8, wherein the absolute value of the effective coupling coefficient is less than 0.5.

Item B10. The sensor system of Item B8, wherein the absolute value of the effective coupling coefficient is less than 0.4.

Item B11. The sensor system of Item B8, wherein the absolute value of the effective coupling coefficient is less than 0.1.

Item B12. The sensor system of Item B8, wherein the absolute value of the effective coupling coefficient is less than 0.05.

Item B13. The sensor system of Item B8, wherein the absolute value of the effective coupling coefficient is less than 0.02.

Item B14. The sensor system of any one of Item B1-B7, wherein each of one or more resonant circuits comprises an inductor and a capacitor.

Item B15. The sensor system of Item B14, wherein the inductor is electromagnetically coupled to the conductive loop.

Item B16. The sensor system of Item B14, wherein the capacitor is electromagnetically coupled to the conductive loop.

Item B17. The sensor system of Item B14, wherein the inductor is an antenna.

Item B18. The sensor system of Item B17, wherein the conductive loop and the antenna is generally in a same plane.

Item B19. The sensor system of Item B17, wherein the conductive loop and the antenna is in a different plane.

Item B20. The sensor system of Item B17, wherein the conductive loop is generally in a first plane and the antenna is generally in a second plane, wherein an angle between the first plane and the second plane is greater than zero.

Item B21. The sensor system of Item B17, wherein the conductive loop and the antenna have a different shape from each other.

Item B22. The sensor system of Item B14, wherein the conductive loop is galvanically connected to a portion of the inductor.

Item B23. The sensor system of Item B14, wherein the conductive loop is galvanically connected to a portion of the capacitor.

What is claimed is:
1. An RF device, comprising:
a closed conductive loop, and
a plurality of resonant circuits, each of the plurality of resonant circuits wirelessly coupled to the conductive loop with an effective coupling coefficient,
wherein each of the effective coupling coefficients has a relative low absolute value such that each of the plurality of resonant circuits has a distinctive resonant frequency.

2. The RF device of claim 1, wherein each of the plurality of resonant circuits has a first resonant frequency in free space and a second resonant frequency modified by the conductive loop.

3. The RF device of claim 2, wherein frequency shift between the first resonant frequency and the second resonant frequency is less than 10% of the first resonant frequency.

4. The RF device of claim 1, wherein the RF device is configured to propagate a plurality of signals, each of the plurality of signals corresponding to one of the plurality of resonant circuits.

5. The RF device of claim 1, wherein the absolute value of each of the effective coupling coefficients is less than 0.5.

6. The RF device of claim 1, wherein the absolute value of each of the effective coupling coefficients is less than 0.1.

7. The RF device of claim 1, wherein each of the plurality of resonant circuits comprises an inductor and a capacitor.

8. The RF device of claim 7, wherein the inductor is wirelessly coupled to the conductive loop.

9. The RF device of claim 7, wherein the inductor is an antenna.

10. The RF device of claim 9, wherein the conductive loop and the antenna is in a different plane.

11. The RF device of claim 9, wherein the conductive loop and the antenna have a different shape from each other.

12. A sensor system, comprising:
a sensing unit configured to detect environmental conditions, and
an RF circuit, comprising:
a closed conductive loop, and
a plurality of resonant circuits, each of the plurality of resonant circuits wirelessly coupled to the conductive loop with an effective coupling coefficient, wherein at least one of the plurality of resonant circuits is electromagnetically coupled to the sensing unit and configured to receive a sensing signal from the sensing unit, and wherein the RF circuit is configured to transmit the sensing signal, wherein each of the effective coupling coefficients has a relative low absolute value such that each of the plurality of resonant circuits has a distinctive resonant frequency.

13. The sensor system of claim 12, wherein the sensing unit comprises a plurality of sensing elements.

14. The sensor system of claim 13, wherein each of the plurality of the sensing elements is electrically coupled to one of the plurality of resonant circuits.

15. The sensor system of claim 14, wherein each of the plurality of the sensing elements generates an output signal, and wherein the corresponding one of the plurality of resonant circuits is configured to receive the output signal and transmit the output signal.

* * * * *